United States Patent [19]

Küsters et al.

[11] 4,327,468
[45] May 4, 1982

[54] CONTROLLED DEFLECTION ROLL

[75] Inventors: Eduard Küsters, Gustav-Fünders-Web 18, 4150 Krefeld; Karl-Heinz Ahrweiler, Krefeld, both of Fed. Rep. of Germany

[73] Assignee: Eduard Küsters, Krefeld, Fed. Rep. of Germany

[21] Appl. No.: 141,808

[22] Filed: Apr. 21, 1980

[30] Foreign Application Priority Data

Jan. 31, 1980 [DE] Fed. Rep. of Germany ....... 3003396

[51] Int. Cl.³ ............................................. B21B 13/02
[52] U.S. Cl. ................................................ 29/116 AD
[58] Field of Search ...... 29/116 AD, 113 AD, 116 R; 100/170

[56] References Cited

U.S. PATENT DOCUMENTS

| | | | |
|---|---|---|---|
| 3,023,695 | 3/1962 | Kuster | 100/170 |
| 4,030,177 | 6/1977 | Hold | 29/116 AD |
| 4,100,662 | 7/1978 | Metso | 29/116 AD |

*Primary Examiner*—Peter P. Nerbun
*Attorney, Agent, or Firm*—Kenyon & Kenyon

[57] ABSTRACT

A controlled deflection roll of the type having a rotative shell through which a non-rotative shaft extends axially so as to form a radial space between the shaft and the shell's inside and self-aligning end bearings journaling the shell to the shaft, and the shell's deflection controlled by internal pressure between the bearings in that space, has an arrangement for applying radial forces between the shell and the shaft on the axial outsides of the bearings so that the shell's deflection throughout its length can be more precisely controlled.

6 Claims, 4 Drawing Figures

CONTROLLED DEFLECTION ROLL

BACKGROUND OF THE INVENTION

A controlled deflection roll of the type illustrated by the Kusters U.S. Pat. No. 3,023,695, Mar. 6, 1962, is characterized by a rotative cylindrical shell having a cylindrical outside adapted to form a pressure rolling nip with a counter roll, and a non-rotative shaft, sometimes called a core or cross-head, extending axially through and radially spaced from the shell's inside, the shaft having ends extending beyond the roll's ends and adapted to receive force exerted in the direction of the rolling nip. Self-aligning end bearings axially spaced short distances inwardly from the shell's ends journal the shell on the shaft and prevent relative radial movement between the shell and shaft at the bearings. Inside of the shell there is a means for applying in the direction of the nip uniformly throughout the shell's length between the end bearings, a force or pressure between the shaft and the shell's inside.

With the controlled deflection roll cooperating, for example, with a solid counter roll, the contour of the shell can be adjusted by varying the internal force, so as to conform to that of the counter roll when the latter deflects under the nip pressure. With the shaft carrying the reaction, it too deflects, but this is inconsequential because the shaft is inside of the shell. The internal force applied between the shaft and the shell's inside may be via the pressure of a sealed body of pressurized hydraulic liquid extending for the length of the roll between the end bearings as is illustrated by the previously mentioned Kusters patent. A uniform force on the roll's inside may also be applied via shoes bearing on the shell's inside and receiving force from pistons in radial cylinders formed in the shaft and provided with a uniform hydraulic pressure behind the pistons, as is illustrated by the Kusters et al U.S. Pat. No. 3,131,625, May 5, 1964, although not showing the end bearings.

A controlled deflection roll of this type using the end bearings has advantages, but a precisely uniform pressure rolling nip line pressure with a counter roll throughout the shell's length is obtained only if the shell's internal force is exactly balanced by the pressure rolling nip pressure or, in other words, the force applied to the ends of the shaft. Normally, such a condition does not exist.

When the above condition does exist, the end bearings are relieved from radial loading, the shell in effect floating relative to the shaft and providing a nip with a counter roll having a uniform line pressure throughout the entire length of the shell. Under more normal conditions, the end bearings are under radial loading and act as fulcrums so that the shell lengths between the end bearings and beyond the outsides of the bearings deflect differently. The disturbing effects are reflected undesirably in the pressure rolling nip line pressure throughout its entire length, or in other words, from end to end of the shell.

In the case of the present invention the object has been to provide correction for such disturbances throughout the entire length of the rotative shell forming the pressure rolling nip with the counter roll. The correction should be effected in such a way as not to interfere with the outside contour of the roll's shell throughout its entire length.

SUMMARY OF THE INVENTION

According to this invention, in addition to the usual means for applying in the direction of the nip uniformly throughout the shell's length between the axial insides of the end bearings the force transmitted from the shaft to the shell's inside, a second means is provided for applying in a direction normally in line with the nip at positions spaced outwardly from the axial outsides of the end bearings, a second force transmitted from the shaft to the shell's inside and at both ends of the shell. In other words, with the shell overhanging the end bearings journaling the shell to the shaft at the ends of the controlled deflection roll with the shaft ends projecting further for receiving the force directed towards the nip, the second means is positioned to exert a radial force between the shaft and the shell's overhanging ends, with everything being on the inside of the shell. Preferably the force exerted on the outsides of the end bearings between the shaft and the shell's inside, is exerted in a direction opposite to that applied by the usual means between the bearings and which exerts its uniform force in a direction towards the nip.

By adjusting this internal counter force between the shaft and the shell's overhanging end at each end of the controlled deflection roll, the line pressure of the roll nip formed with a counter roll can be made more uniform and controlled more precisely.

DESCRIPTION OF THE DRAWINGS

A specific example of an embodiment of the present invention is illustrated by the accompanying drawings in which.

DETAILED DESCRIPTION OF THE INVENTION

Figure 1:
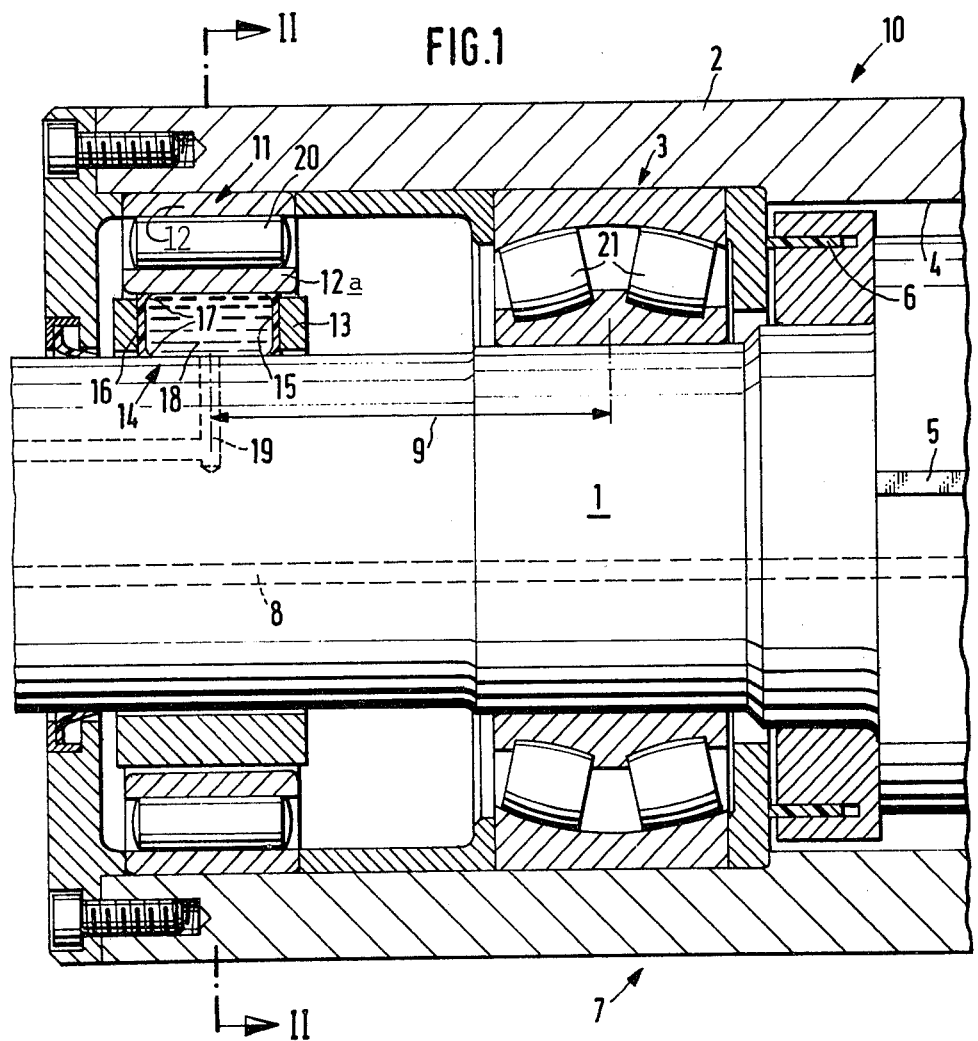
FIG. 1 is a longitudinal section through one end of the controlled deflection roll.

In FIG. 1 only one end of the controlled deflection roll 10 is illustrated but with the understanding that the other end is correspondingly constructed.

Figure 3:
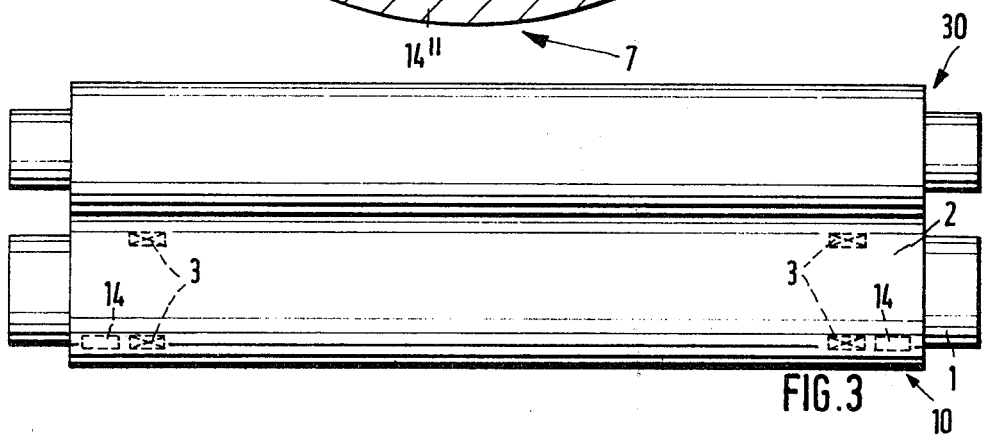
FIG. 3 shows a controlled deflection roll forming a pressure rolling nip with a counter roll.

In each end of the roll 10, the non-rotative or stationary shaft 1 journals the cylindrical roll shell 2 via a self-aligning anti-friction end bearing 3 spaced a short distance inwardly from the end of the shell with the shaft projecting as required to receive the force providing the nip pressure formed by the outside of the shell cooperating with a counter roll as indicated by FIG. 3, described more in detail hereinafter.

As usual, the inside 4 of the shell is radially spaced from the shaft as required for the individual deflection of the shaft and shell, the first force applied throughout the length between the two end bearings being provided in this case by a body of pressurized hydraulic liquid sealed throughout the length between the bearings by side seals 5 and end seals 6. The thus enclosed space or chamber containing the hydraulic fluid extends for substantially 180° of the circumference of the shaft and shell and is of course on the side of the controlled deflection roll facing the rolling nip formed with the counter roll. In the case of FIG. 1 this side is indicated by the arrow 7, the supply of pressurized hydraulic fluid being fed to the chamber formed in this case below the side seals 5, via a conduit indicated at 8. Being a sealed body of pressurized hydraulic fluid extending for the length of the shell and shaft between the end bearings, the force or pressure applied between the shaft and the side of the shell on the inside of the latter, is uniform throughout.

At a center-to-center distance 9 on the axial outside of the bearing 3 a second anti-friction bearing 11 is positioned, this being a plain roller bearing and having an outer race 12 engaging the inside of the shell's overhanging end on the outside of the bearing 3, and an inner race 12a providing a substantial radial clearance or space between it and the shaft. In the radial space between the inner race 12a and the shaft there is a ring 13 which also surrounds the shaft but provides radial clearance between the ring's inner and outer periphery and the race 12a and shaft 1. When the controlled deflection roll is working, the shaft projecting outwardly beyond the bearing 3 experiences angular deflections and the play between peripheries of the ring 3 and the race 12a and shaft 1 should not interfere with such shaft deflections. The roll shell 2, of course, also experiences angular deflections outwardly beyond the bearing 3. This angular deflection of the shaft can be about 20 mm in the case of a roll from 8 to 10 m long and the distance 9 is only a small fraction of the entire roll length. Therefore, the play which must be permitted by the ring 13 is only a small fraction of the 20 mm and is at most in the order of about 1 mm radial displacement.

The ring 13 serves to position the force element 14 which applies the force between the end of the shaft and the overhanging part of the shell on the axial outside of the bearing 3 and which is normally applied in a direction opposite to the side 7 of the shell 2 which forms the nip with the counter roll.

This element 14 is retained in a rectangular radial hole formed in the ring 13, the force element 14 in this case comprising an inflatable enclosure formed by a circumferentially continuous tubular wall 16 arranged radially with respect to the shaft and held by the wall of the hole 15 in the ring 13. This tubular wall is made of elastically flexible material, such as rubber, and has lip seals on its top and bottom peripheries which extend inwardly so as to press outwardly, at the opposite ends of the element, respectively against the inner race 12a of the bearing 11 and the shaft 1. Pressurized hydraulic fluid can be fed into the hole in the ring 13 via a duct 19 formed in the shaft 1 and extending to the free end of the shaft. The inside of the inner race 12a and the shaft 1 are directly exposed to the pressure of the hydraulic liquid 18 fed into the elastically flexible wall and lip seals of the part 16.

It follows that the element 14 can exert a bending moment having the lever arm length indicated at 9. This bending moment is superimposed on the moments and forces resulting from the shell deflection controlling forces throughout the major length of the roll 10 by the hydraulic liquid in the chamber or enclosure formed by the usual side seals 5 and end seals 6. The latter or first force in FIGS. 1 and 2 is directed downwardly while the second force exerted by the element 14 is upwardly or in the opposite direction, both being radial forces with respect to the roll.

Figure 2:
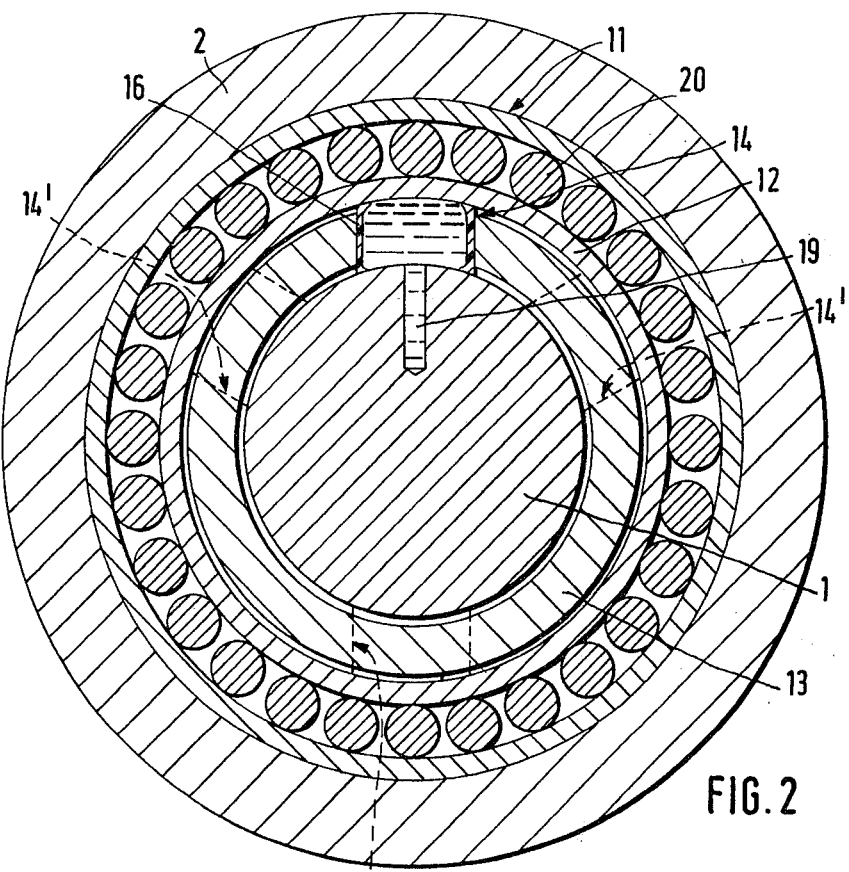
FIG. 2 is a cross section taken on the line II—II in FIG. 1.

In FIGS. 1 and 2 only one of the force elements 14 is shown, this being on the side of the shaft 1 which is opposite to the pressure rolling nip side 7. However, more force elements can be used if desired or necessary, the broken lines in FIG. 3 suggesting the location of a second one of the force elements, in this case indicated by 14'. The hole 15 in the ring 13 need not necessarily be of the same extent circumferentially with respect to the shaft and bearing race as is indicated, but it could be circumferentially longer to provide larger piston areas or surfaces for receiving the force of the pressurized liquid. When more than two of the force elements are used, they can be connected to receive hydraulic liquid having different pressures. The illustrated design of the force element can be varied. For example, piston and cylinder units, pressure cushions of the bellows type, and even mechanical jack designs can be used.

In all cases the shaft end beyond the axial outside of the bearing 3 must permit angular deflections of this shaft end relative to the shell 2, a bearing means should be provided between the force element and the inside of the rotative shell, and of course, the force element should be capable of providing the necessary force in the appropriate direction, or directions if more than one element is used, to correct as much as possible for the shell flexure occurring throughout the shell's entire length.

Figure 4:
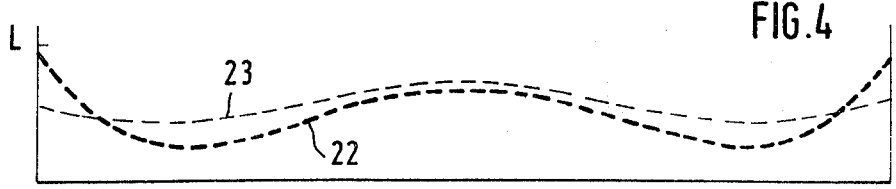
FIG. 4 graphically illustrates the nip line pressure correction that can be obtained.

To illustrate the significance of this invention, FIGS. 3 and 4 show the new controlled deflection roll 10 as the lower roll of a roll set formed by an upper solid roll 30, the two rolls cooperating to form a pressure rolling nip through which a web of material such as paper or cloth can be pressure rolled, for calendering, for example. In this application the pressure elements 14 are positioned at the bottom of the roll and, of course, outboard or beyond the axial outsides of the self-aligning bearings 3 which journal the shell to the shaft 1 so that at those points radial relative movement between the shell and shaft is prevented.

In FIG. 4 the heavy dashed line 22, as shown by both practice and theory, indicates the relatively non-uniform nip line pressure prevailing throughout the length of the nip of the two rolls. Because of the end bearings 3, this lack of uniform nip line pressure prevails even though the pressure applied between the shaft and the shell throughout the roll between the axial insides of the bearings 3 is completely uniform throughout this roll length. This is explained by the fact that all of the parts, including the shell and shaft, are made of metal, normally steel. The shell has very substantial stiffness and functions as a beam extending between the bearings 3 and receiving beam stress via the internal pressure or force between the shell and the shaft. With the shell bending to conform to the beam flexure of the solid roll 30, the shell end portions extending outwardly beyond the bearings 3 which act as fulcrums, angularly deflect. This is reflected in the nip line pressure of necessity.

To understand the above more fully, it is advisable to start with the setting process of the two rolls. Being a controlled deflection roll, by internal pressure control the lower roll 10 can be set free from flexure, but the upper roll, being a solid steel roll, sags in the middle under its own weight so that the first intercontact between the rolls is in their middle portions. Consequently, the nip line pressure is initially higher in the middle than at the end portions of the two rolls. If through force applied to the roll ends in opposite directions, the rolls are set closer together, both rolls may contact with each other over their entire lengths, but the increase in the line pressure in the middle area is preserved. If the nip line pressure is further increased, the contact between the rolls has the greater pressure at the roll ends because they can give way least insofar as the conventional roll 30 is concerned. The line pressure then drops towards the middle of the rolls because the roll 30 bends upwardly at that location. The line pressure distribution then adjusts itself as shown by the heavy dashed line 22 in FIG. 4.

Incidentally, the line pressure curve 22 was obtained from the calculations performed by the method of finite elements of the deviation of the bending lines of the rolls 10 and 30 when free from each other. The shape of the deviations shown is approximately reflected in the nip line pressure. A so-called W-line is obtained which shows higher values in the center and at the two ends than in the regions therebetween.

By using the force elements 14 at the points indicated in FIG. 3, something can be subtracted from the pressure forces at the ends of the roll gap when the force elements 14 are operated. The force applied between the bearings can be varied by varying the pressure of the fluid introduced via the duct 8 and the force of the elements 14 can be varied by varying the pressure of the fluid introduced via the duct 19. Consequently, pressure of the branches of the roll nip pressure line at the ends of the roll nip can be lowered, keeping in mind that the force elements 14 are arranged at the points of highest line pressure. With the shell 2 fulcrumed on the shaft via the bearings 3, force elements providing bending moment on the shell at its outer ends and which has the greatest effect adjacent to the bearings 3 because of the limited bending momentum of inertia of the shell 2, increases the line pressure of the roll nip portion inwardly between the bearings 3.

It follows that a nip line pressure distribution approximately like the curve 23, shown by lighter dashed lines, can be obtained. Although this can be considered only a qualitative statement, it does show that the nip line pressure has been substantially equalized. The heavier deviations for a uniform line pressure shown by the curve 22, is flattened out and under favorable circumstances can be practically made to disappear.

What is claimed is:

1. A controlled deflection roll comprising a rotative cylindrical shell having an outside adapted to form a pressure rolling nip with a counter roll, a non-rotative shaft extending axially through and radially spaced from the shell's inside and having ends extending beyond the roll's ends and adapted to receive force exerted in the direction of said nip, self-aligning bearings axially spaced inwardly from the shell's ends and positioned inside of the shell and journaling the shell on the shaft so as to prevent relative radial movement between the shell and shaft at the bearings, a first means for applying in said direction of the nip uniformly throughout the shell's length between the axial insides of said bearings a first force transmitted from said shaft to the shell's inside, and a second means disposed between said shaft and said shell in the area between said shell's ends and the axial outsides of said bearings for applying, in a direction in line with said nip, at positions inside of the shell and spaced from the axial outsides of said bearings, a second force transmitted from said shaft to the shell's inside.

2. The roll of claim 1 in which said second means applies said second force in a direction opposite to said direction of the nip.

3. The roll of claim 1 in which said second means comprises in each instance a pressure-exerting means non-rotatively connected to said non-rotative shaft inside of the shell at a position on the axial outside of the self-aligning bearing, and an annular bearing surrounds the shaft in radial alignment with the force-exerting means and journals the latter and the shell together.

4. The roll of claim 3 in which said annular bearing is an anti-friction bearing having an outer race bearing on the shell's inside and an inner race engaged by said force-exerting means.

5. The roll of claim 4 in which said force-exerting means is formed by a ring encircling said shaft inside of said inner race and having a radial wall thickness permitting relative radial movement between said inner race and the shaft, said ring having a radial hole positioning an inflatable enclosure radially bearing on the inner race and the shaft.

6. The roll of claim 5 in which said enclosure is formed by an elastically flexible, circumferentially continuous tubular wall supported by the side wall of said hole and having lip seals at the ends of the tubular wall and respectively bearing on said inner race and the shaft.

* * * * *